UNITED STATES PATENT OFFICE.

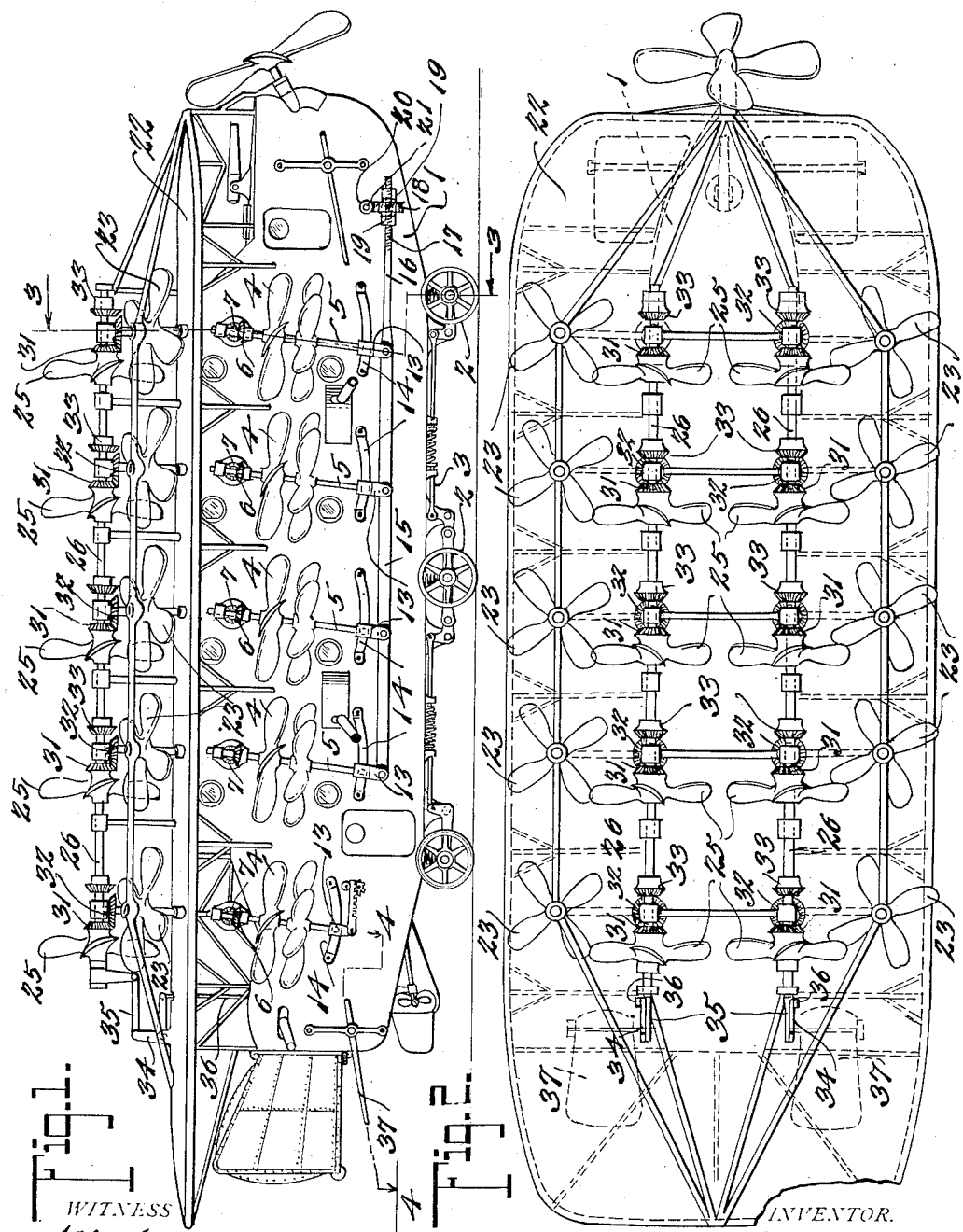

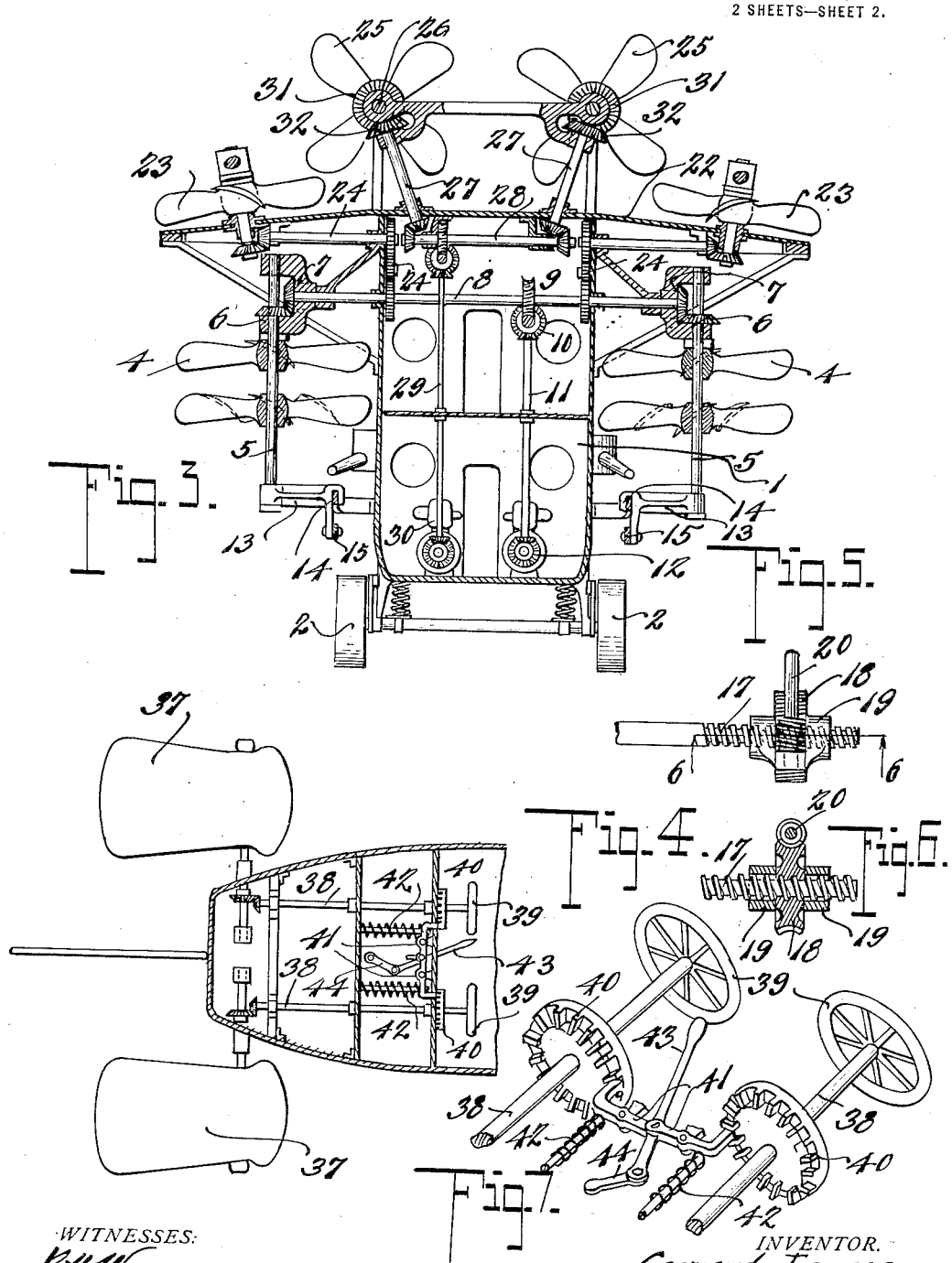

GASPARD LEGROS, OF LAWRENCE, MASSACHUSETTS.

AIRSHIP CONSTRUCTION.

1,357,502.  Specification of Letters Patent.  Patented Nov. 2, 1920.

Application filed November 26, 1917. Serial No. 204,043.

*To all whom it may concern:*

Be it known that I, GASPARD LEGROS, a subject of the King of Great Britain, residing at Lawrence, in the county of Essex and State of Massachusetts, have invented certain new and useful Improvements in Airship Constructions, of which the following is a specification.

This invention has to do with airship constructions, and in particular to propelling means therefor so constructed and arranged as to provide for maximum lifting and driving forces. Among other features of my invention is the provision for shifting the propellers of the craft by means of which they may be arranged to exert their propelling forces in different directions, and the embodiment of means for positively locking the elevating or stabilizing planes of the machine against movement, at the will of the operator.

These and such other objects as may hereinafter appear are attained by the novel construction, combination and arrangement of parts to be hereinafter specifically described and claimed. Reference will now be had to the accompanying drawing forming a part of this specification, wherein:

Figure 1 is a side elevation of an airship constructed in accordance with my invention;

Fig. 2 is a top plan view thereof;

Fig. 3 is a sectional view on the line 3—3 of Fig. 1;

Fig. 4 is a fragmentary sectional view on the planes indicated by the line 4—4 of Fig. 1;

Fig. 5 is a detail plan view of the shifting gear connections for the lifting propellers;

Fig. 6 is a sectional view on the line 6—6 of Fig. 5;

Fig. 7 is a perspective view of the locking means for the controls for the stabilizing planes.

Referring to the drawings, 1 indicates the body of the airship which is preferably subdivided into different compartments as may be required for accommodating the mechanisms required for operating the ship and suitable guns or other weapons of defense. The body is preferably provided with a series of ground wheels 2 having equalizing connections 3 by means of which the impact incident to landing of the ship may be suitably distributed throughout the wheel support. At each side exteriorly the airship is provided with a series of propellers 4, there being preferably two such propellers mounted upon a single, substantially vertical shaft 5, and a series of such arrangements being employed. These propellers are primarily lifting propellers and each of the shafts is provided with a pinion 6 meshing with a pinion 7 upon a horizontal driving shaft 8 which extends into the interior of the body and carries a worm gear 9 driven by a gear connection 10 from the engine shaft 11 operated by the engine diagrammatically indicated at 12. The lower end of the respective shafts 5 is supported by means of a bracket 13 which is flanged to engage over a guide-way 14 connected to the side of the body, and a connecting rod 15 is connected to the brackets 4 operating for shifting the respective shafts 5 simultaneously forwardly or in a rearward direction. The connecting rod 15 is actuated by suitable mechanism consisting of the rod 16 which is connected to the rod 15 at one end and is threaded as indicated at 17 in Fig. 5 at the other end. Upon this rod is mounted a worm gear 18 internally threaded to operate upon the threaded extremity 17. At each side of the gear 18 collars 19 are arranged to prevent relative movement of the worm gear 18 which is actuated by the worm 20 mounted upon a shaft 21 extending into the body where it is rotated either manually or mechanically so as to effect shifting of the rod 16 forwardly or rearwardly, and in turn moving the propeller shafts 5 accordingly.

It will be obvious that the nearer vertical the shafts 5 are arranged, the more truly the propellers 4 exert a lifting action, but when sufficient elevation is obtained these propellers may be shifted by the mechanism just described so as to take an angular position for the purpose of changing the direction in which the propelling forces are exerted to provide for forward or rearward drive in conjunction with the driving propellers hereinafter to be described.

Projecting laterally from the body are sustaining protector planes 22 which carry upon their upper surfaces horizontally operating propellers 23, these being driven through the train of gears 24 intermediate the driving shaft 8 and the lateral, relatively short shafts 24. These propellers are also lifting propellers and operated simultaneously with the side lifting propellers 4 above described. In addition to the lifting propellers which have been mentioned, forward and rearwardly driving propellers are mounted upon the body. Two alined sets of such propellers are mounted upon the top of the body as indicated at 25, a driving shaft 26 carrying each set and being driven by means of shafts 27 in turn driven by the shaft 28 which is actuated by the vertical shaft 29 driven by the engine 30. A separate control is thus provided for the driving propellers and may be operated independently of the lifting propellers driven by the engine 12. Each of the propellers 25 is provided with a bevel pinion 31 which in one position of said propeller meshes with the pinion 32 on the shaft 27. Adjacent to each propeller, however, is a second pinion 33 fixed to the shaft 26 so that when the shaft 26 is shifted in a longitudinal direction the pinion 31 is disengaged from and the pinion 33 engaged with the said pinion 32, thus obtaining a reversal of the movement of the propellers in an obvious manner.

At the rear end each shaft 26 is connected to a bell crank lever 34 by a connecting rod 35 and an actuating rod 36 extends into the body of the airship for manual or mechanical actuation to obtain the shifting action of the shaft 26 for forward or rearward drive, as the case may be. As hereinbefore stated, the propelling forces exerted by the propellers 25 are assisted by the propellers 4 when the latter are arranged in an angular position from the vertical, and thus a maximum lifting and driving propulsion is provided for the airship.

Extending laterally and arranged both at the forward and rearward ends are suitable stabilizing planes 37, each of which is independently operated by a controlling shaft 38 having the control wheel 39 connected thereto. Intermediate the length the shaft is provided with an annular locking segment 40 which is adapted to be engaged by a locking device arranged between the pair of controlling shafts 38 at the respective forward and rear ends of the ship as indicated in Fig. 7. The locking means consists of a pair of dogs 41 pivotally supported intermediate their lengths. Each dog engages its adjacent segment 40 at one end and at its other end is connected to the shifting lever 43. The lever 43 is connected at its lower end to the link 44.

It will be apparent that movement of the lever 43 in one direction will cause straightening of the link 44 into alinement with the lever 43, throwing the dogs out of engagement with the segments 40 and movement of said lever in the opposite direction will break the toggle action and permit the dogs to assume their locking positions.

Having thus described my invention, what I claim as new and desire to secure by Letters Patent is:

1. An airship construction comprising a body, a prime mover thereon, a driving shaft, propellers fixedly secured to said shaft, means operated by the prime mover and operatively connected to the driving shaft, and means for shifting the shaft and the propellers to reverse the operative connections thereof with the engine operated means to thereby reverse the shaft and propellers.

2. An airship construction of the class described comprising a body, a prime mover thereon, a driving shaft, spaced gear elements on said shaft, a shaft driven by the prime mover and relatively stationary with respect to said gear elements, and means for shifting the driving shaft to thereby change the gear connection with the driven shaft for reversal of the driving shaft and propellers.

3. An airship construction of the class described comprising a body, a prime mover thereon, a driving shaft, bearing supports on which the shaft is shiftably mounted, a gear element carried by a propeller, a second gear element fixed to the shaft in spaced relation to the first mentioned gear element, a driving gear operated by the prime mover and arranged between the two gear elements aforesaid, and means for shifting the driving shaft longitudinally to thereby change the gear connection with the intermediate gear for reversal of the propellers.

In testimony whereof I affix my signature.

GASPARD LEGROS.